United States Patent [19]

Iwata

[11] 4,122,466
[45] Oct. 24, 1978

[54] ZOOM LENS CAMERA EQUIPPED WITH FLASH UNIT

[75] Inventor: Hiroshi Iwata, Osaka, Japan

[73] Assignee: West Electric Co. Ltd., Japan

[21] Appl. No.: 768,873

[22] Filed: Feb. 15, 1977

[30] Foreign Application Priority Data

Feb. 19, 1976 [JP] Japan .................. 51-17654

[51] Int. Cl.² ..................... G03B 7/16; G03B 15/03
[52] U.S. Cl. ......................... 354/32; 354/149
[58] Field of Search .................. 354/32, 33, 34, 35, 354/197, 126, 139, 149, 59

[56] References Cited

U.S. PATENT DOCUMENTS

| 3,404,612 | 10/1968 | Harvey | 354/139 X |
| 3,783,261 | 1/1974 | Hartmann | 354/149 X |
| 3,798,668 | 3/1974 | Hartmann | 354/149 |
| 3,882,514 | 5/1975 | Graham | 354/149 |

FOREIGN PATENT DOCUMENTS

2,328,654 12/1974 Fed. Rep. of Germany .......... 354/126

Primary Examiner—Donald A. Griffin
Attorney, Agent, or Firm—Stevens, Davis, Miller & Mosher

[57] ABSTRACT

A zoom lens camera equipped with a flash unit including a flash unit and zoom lens. The illuminating angle of the flash unit varies with a change in the magnification of the zoom lens so as to effectively direct the flash light of the flash unit to an object to be photographed. Further, when the flash unit includes a light sensor sensing the light reflected from the object, the sensing angle of the light sensor also varies with a change in the magnification of the zoom lens so as to effectively control the quantity of the flash light directed to an object to be photographed.

8 Claims, 7 Drawing Figures

ZOOM LENS CAMERA EQUIPPED WITH FLASH UNIT

BACKGROUND OF THE INVENTION

The present invention relates to a camera equipped with flash unit, particularly to a zoom lens camera equipped with a zoom lens and an electronic flash unit which can automatically control its illuminating angle in accordance with the adjustment of the magnification of a zoom lens. The zoom lens camera, when combined with a light-sensing device, can adjust a light-sensing angle as well.

Generally, in taking a photograph of an object by using a zoom lens, its magnification is changed by changing its focal distance. This results that the angle of view for the object to be photographed changes with the magnification. In the case of supplying an artificial illumination by an electronic flash unit for photographing with such a lens system, the illuminating angle of the electronic flash unit should be made to be adjusted to correspond to the minimum focal distance of the zoom lens to be used so as it may cover all angles of view dependent on the change of the magnification.

The illuminating angle corresponding to the minimum focal distance results in the widest illuminating angle of the electronic flash unit. Now, if the electronic flash unit that has been set for the minimum focal distance of the zoom lens is used with the magnification changes by setting a focal distance longer than the minimum focal distance, only a part of the light is directed for the illumination of an object to be photographed, since the angle of view for the object is now smaller, resulting in an inefficient use of the flash light.

A distance possible to illuminate an object with an electronic flash unit set at the widest illuminating angle, is limited. It may be preferable that the electronic flash unit can direct an intensive light as far as possible. This is desirable in the case of a camera having a zoom lens, since the latter is to photograph an enlarged view of a far away object.

Electronic flash units are known which can sense the light reflected from an object with a lighsensing element and can cease providing illuminating light when the quantity of the light sensed reaches a predetermined value. In order to combine this kind of electronic flash unit with the above-mentioned zoom photo camera, a light-sensing angle sensed by the light-sensing portion should be also made variable in accordance with a change in the magnification of the zoom lens for taking a photograph of an object at a long distance.

Because angles of view for an object are changed with the magnification of the zoom lens being changed, the light-sensing element will not sense the light reflected only from the object in the angle of view, if its light-sensing angle is fixed. Therefore it cannot sense the reflected light correctly and therefore cannot correctly control the quantity of flash light.

Therefore, it is a general object of this invention to solve the above-mentioned problems. The invention will be better understood from the following description taken in connection with the accompanying drawings in which.

DETAILED DESCRIPTION OF THE INVENTION

Figure 1:
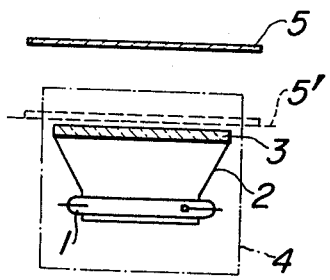
FIG. 1 is a basic diagram illustrating the change in illuminating angles of an electronic flash unit used for a camera equipped with a flash unit in accordance with the invention.

The present invention is now explained in detail with reference to the examples shown in the drawings. FIG. 1 shows a basic structure for varying the illuminating angle of an electronic flash unit provided in a camera in accordance with this invention. The flash unit light source 4 having a flashing lamp 1, consists of a flash a reflector 2 and a panel 3 for producing a specific illuminating angle, which is a well known flash light source 4 (hereinafter, flash light source' will be considered as including a lamp, reflector and a panel, unless otherwise specified). A lens 5, such as a convex lens or a Fresnel lens is disposed in front of the flash light source 4. The central intensity of its light radiation is changed as the illuminating angle is varied by changing the distance between the lens 5 and the panel 3.

In connection with its combination with a zoom lens, the flash unit is so designed that an illuminating angle of the flash light source to cover an angle of view for the minimum focal distance is obtained when the lens 5 is set to a position indicated by a dotted line 5' in the drawings and the flash unit operates in such a way that a gradual movement of the position of lens 5 away from the panel 3 reduces the illuminating angle gradually, finally bringing the illuminating angle to correspond with the maximum focal distance of the zoom lens.

According to the present invention, an electronic flash unit which enables a continuous variation of its illuminating angle is thus connected mechanically with a variable focal distance mechanism for changing the magnification of a zoom lens so that variations of the magnification of the zoom lens change the illuminating angle of the flash unit simultaneously and automatically.

Figure 2:
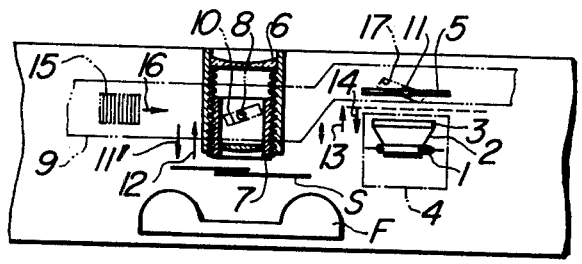
FIG. 2 is a plan view illustrating the structure of an embodiment of a camera equipped with a flash unit in accordance with the invention.

FIG. 2 illustrates one embodiment of the invention. A zoom lens 6 and a flash light source 4 are incorporated in a body. The zoom lens 6 is of a well known straight advancing helicoid type. At the movable mirror cylinder 7 of the zoom lens 6 is a first protrusion 8 which is passed through a first guide hole 10 in a slide linking member 9 which reciprocally moves in its longitudinal direction so as to move the movable mirror cylinder 7 back and forth as indicated by arrows 11' and 12. On the other hand, a second protrusion 11 provided to the lens 5 is inserted in a second hole 17 provided in the slide linking member 9 so that the lens 5 will move back and forth as indicated by arrows 13 and 14 with the reciprocating movement of the slide linking member 9. In the drawing, 'S' and 'F' denote shutter and film, respectively. Since the first and second guide holes 10 and 17 are designed in the shapes as shown in the drawings, when a button 15 provided on the slide linking member 9 is moved in the direction indicated by an arrow 16, the movable mirror cylinder 7 of the zoom lens 6 moves in the direction of the arrow 11' so that the focal distance becomes longer, making the magnification ratio greater, and the lens 5 simultaneously moves in the direction of arrow 13, so as to reduce the illuminating angle. Thus, the illuminating angle of the flash light source will automatically become narrower when the magnification of the zoom lens 6 becomes greater. This means that the central intensity of light is increased as the illuminating angle of the flash light source 4 is reduced, finally resulting in a spot illumiantion by the flash light at a far distance.

Figure 3:
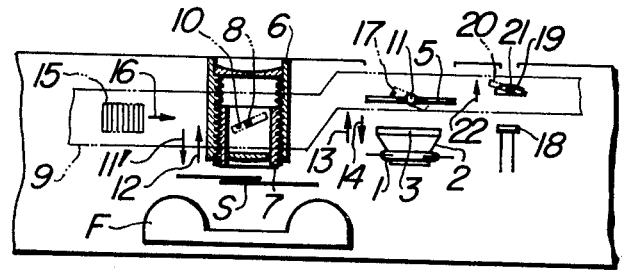
FIG. 3 is a plan view showing the structure of another embodiment of the invention.
Figure 4:
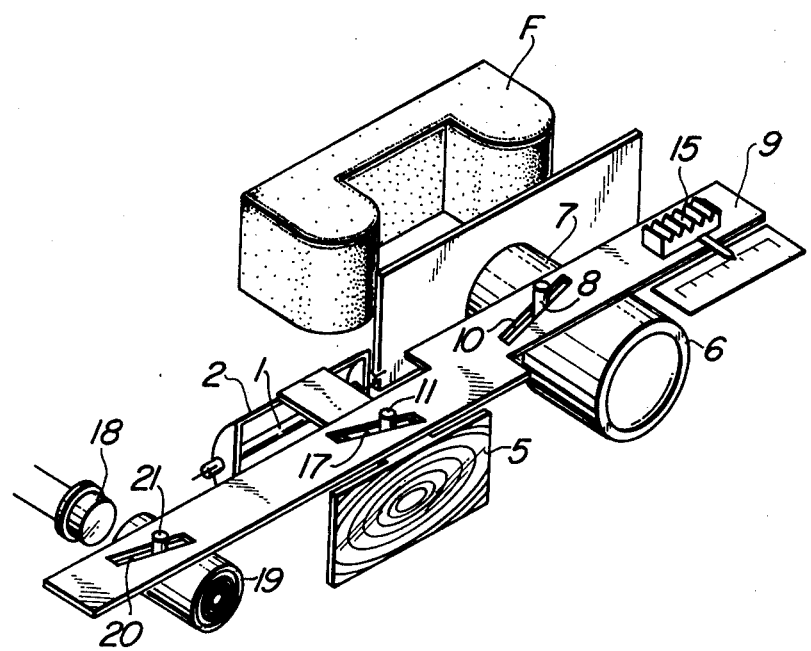
FIG. 4 is a perspective view of FIG. 3.

FIG. 3 is a plan view illustrating another embodiment of a camera equipped with a flash unit in accordance with this invention. The camera incorporates an automatic electronic flash unit which can automatically sense light reflected from an object by a light-sensing portion and control the quantity of a flash light.

As shown in the drawing, there is provided in front of a light-sensor 18 which senses the quantity of a light reflected from an object, a light-receiving plate 19 made of, for example, a convex lens. A slide linking member 9 like the one described in the first embodiment has a third slide guide hole 20 in which a protrusion 21 provided to a cylindrical body carrying the light-receiving plate 19 is inserted. As the slide linking member 9 moves in the direction of an arrow 16, the light-receiving plate 19 moves in the direction indicated by an arrow 22. The light-sensing angle of the light-sensor 18 is, therefore, reduced in accordance with the movement of the light-receiving plate 19 in the same direction so that the illuminating angle of the electronic flash unit reduces with increasing magnification ratio of the zoom lens 6, and this makes possible a light-sensing corresponding to an angle of view for an object to be photographed.

Another problem which arises from the combination of an electronic flash unit and a zoom lens, is that an available distance to an object to be illuminated by flash light is limited by the brightness of the electronic flash unit. The illuminating angle of the unit is varied in accordance with the magnification of the zoom lens, as the result, the available distance that can be illuminated by the unit, continuously changes with the variation in magnification of the zoom lens. However, since the available distance is limited as mentioned above, some kind of detection or indication of a marginal distance becomes necessary.

The third embodiment of the invention has, in addition to the preceding embodiment, a checking device for making the focus of the zoom lens impossible when the focal distance exeeds the maximum marginal distance for the illumination. This limits the movement of a focusing mechanism provided separately in the zoom lens.

Generally, the zoom lens 6 is provided with a movable focusing ring 23, and the operator focuses the lens referring to the indicator provided on the said ring, or in the case that it is used in combination with a single lens reflex camera, he sees directly the image of a object in the finder and adjust the ring to a correct focal distance.

Figure 5:
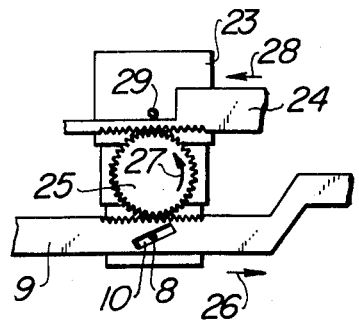
FIG. 5 is a plan view which illustrates limiting means for limiting the movement of the focusing mechanism for a zoom lens used in a camera equipped with flash unit in accordance with the invention.
Figure 6:
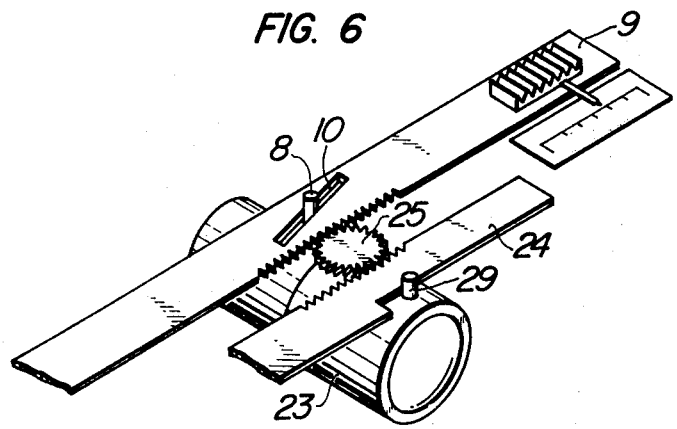
FIG. 6 is a perspective view thereof.
Figure 7:
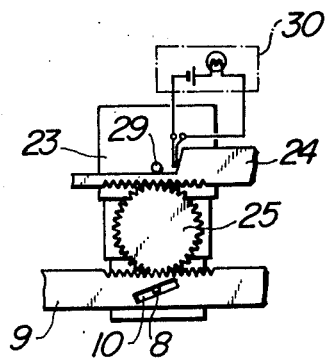
FIG. 7 is a plan view showing indicating means provided in addition to the limiting means illustrated in FIG. 5.

In the third embodiment of the invention illustrated in FIG. 5, a distance limiting mechanism 24 which limits the movement of the movable focusing ring 23, is provided in such a zoom lens, and is engaged via gearing member 25 with the slide linking member 9. As the slide linking member 9 moves in the direction of the arrow 26, the magnification comes up, the gearing member 25 rotates in the direction of the arrow 27 and the distance limiting mechanism 24 moves in the direction shown by the arrow 28, thereby limiting the moving distance of a protrusion 29 in the movable focusing ring 23. In this manner, it makes it impossible to focus to a distance exceeding the limit of the flash light illumination. To this distance limiting mechanism 24, an indicating circuit 30 as illustrated in FIG. 7 may be provided so as to inform the operator that the focus as exceeded the limit of the operable range.

While the above embodiments disclose the electronic flash unit integrally incorporated with the camera body, it is to be understood that the electronic flash unit should not necessarily be integrally incorporated but it may be made separate as well.

As described above, the present invention has the effect that an illumination by an electronic flash unit cooperating with a zoom lens, can be made very efficient, since the various adjustments necessary for an electronic flash unit can be made automatically, including the stopping of the operation of the focusing ring when a focal distance of the zoom lens goes beyond the limit of the illumination by the flash light.

It is to be understood that the invention is not limited in its application to the detailed construction and arrangement of parts illustrated in the accompanying drawings, since the invention is capable of other embodiments and of being practiced or carried out in various way. For example, the control button 15 may be eliminated so that the movement of the linking member 9 is controlled directly by the magnification adjusting ring or the magnification adjusting knob of the zoom lens 6.

What we claim is:

1. A camera comprising:
    a zoom lens including a movable focusing ring;
    a flash unit including a flash light source means, and a light sensing means for sensing the light reflected from an object to be photographed;
    means for changing the magnification of said zoom lens;
    means for adjusting both the illuminating angle of said flash light source means and the light sensing angle of said light sensing means; and
    a linking member operatively connecting said magnification changing means with said adjusting means so that the illuminating angle of said flash light source means and the light sensing angle of said light sensing means vary in correspondence with the variation of the magnification of said zoom lens.

2. A camera as set forth in claim 1 wherein said adjusting means includes
    (i) a lens disposed in front of said flash light source means of said flash unit; and
    (ii) a displacement mechanism linking said lens with said linking member such that the movement of said linking member causes said lens to move.

3. A camera as set forth in claim 1 wherein said adjusting member consists of
    (i) a first lens disposed in front of said flash light source means of said flash unit;
    (ii) a first displacement mechanism linking said first lens with said linking member such that the movement of said linking member causes said first lens to move;
    (iii) a second lens disposed in front of said light-sensing means; and (iv) a second displacement mechanism linking said second lens with said linking member such that the movement of said linking member causes said second lens to move.

4. A camera as set forth in claim 1, further comprising;
a limiting mechanism associated with said linking mechanism, said limiting mechanism limiting the focusing movement of said movable focusing ring.

5. A camera as set forth in claim 4, further comprising;
an indicating mechanism provided in association with said limiting mechanism, said indicating mechanism being adapted to indicate the limiting stop for the focusing movement of said movable focusing ring when said movable focusing ring is locked by said limiting mechanism.

6. A camera as set forth in claim 1, wherein said magnification changing means comprises a magnification adjusting ring by means of which said linking member is controlled.

7. A camera as set forth in claim 6, wherein said magnification changing means comprises a magnification control knob for controlling movement of said magnification adjusting ring.

8. A camera as set forth in claim 7, wherein said magnification control knob controls the movement of said linking member.

* * * * *